(12) United States Patent
Carmone et al.

(10) Patent No.: US 10,724,439 B2
(45) Date of Patent: Jul. 28, 2020

(54) CHARGE GAS COMPRESSION TRAIN FOR ETHYLENE

(71) Applicant: Nuovo Pignone Technologie SRL, Florence (IT)

(72) Inventors: Clarice Carmone, Florence (IT); Nicola Banchi, Florence (IT); Giuseppe Iurisci, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 190 days.

(21) Appl. No.: 15/747,210

(22) PCT Filed: Jul. 22, 2016

(86) PCT No.: PCT/EP2016/067566
§ 371 (c)(1),
(2) Date: Jan. 24, 2018

(87) PCT Pub. No.: WO2017/017024
PCT Pub. Date: Feb. 2, 2017

(65) Prior Publication Data
US 2018/0238236 A1    Aug. 23, 2018

(30) Foreign Application Priority Data

Jul. 24, 2015   (IT) ................................ 102015380033

(51) Int. Cl.
*F02C 7/143*   (2006.01)
*F01D 5/06*    (2006.01)
(Continued)

(52) U.S. Cl.
CPC ............. *F02C 7/143* (2013.01); *F01D 5/066* (2013.01); *F02K 5/00* (2013.01); *F04D 17/122* (2013.01);
(Continued)

(58) Field of Classification Search
None
See application file for complete search history.

(56) References Cited

U.S. PATENT DOCUMENTS 3,200,754 A * 8/1965 Burgin ..................... F04D 9/04
                                                       415/73
3,504,986 A * 4/1970 Jackson .............. F04D 29/2277
                                                       415/11
(Continued)

FOREIGN PATENT DOCUMENTS

AU    2013204886 A1    10/2014
AU    2013204886 B2     4/2015
(Continued)

OTHER PUBLICATIONS

First Office Action and Search issued in connection with corresponding CN Application No. 201680043504.9 dated Jan. 3, 2019 (English Translation not Available).
(Continued)

*Primary Examiner* — Peter J Bertheaud
*Assistant Examiner* — Geoffrey S Lee
(74) *Attorney, Agent, or Firm* — Baker Hughes Patent Organization

(57) ABSTRACT

A charge gas compression train for ethylene including a first compressor including a first group of compression stages, a second group of compression stages, and a third group of compression stages. The first group of compression stages includes an outlet configured to be connected to a first intercooler inlet. The second group of compression stages includes a second compressor inlet configured to be connected to a first intercooler outlet, and a second compressor outlet configured to be connected to a second intercooler inlet. The third group of compression stages includes a third compressor inlet configured to be connected to a second intercooler outlet. The first, the second, and the third group (Continued)

of compression stages are integrated in a first common casing and operate at the same rotation speed. The first compressor includes a plurality of unshrouded and shrouded impellers, where an unshrouded impeller is positioned upstream to a shrouded impeller.

11 Claims, 1 Drawing Sheet

(51) Int. Cl.
    *F04D 17/12*     (2006.01)
    *F04D 29/28*     (2006.01)
    *F25J 3/02*     (2006.01)
    *F02K 5/00*     (2006.01)

(52) U.S. Cl.
    CPC .......... *F04D 29/284* (2013.01); *F25J 3/0219* (2013.01); *F25J 3/0238* (2013.01); *F05D 2220/72* (2013.01); *F05D 2260/211* (2013.01); *F25J 2210/12* (2013.01); *F25J 2215/62* (2013.01); *F25J 2220/02* (2013.01); *F25J 2230/20* (2013.01); *F25J 2230/22* (2013.01); *F25J 2230/30* (2013.01); *F25J 2240/70* (2013.01)

(56) References Cited

U.S. PATENT DOCUMENTS

| | | | | |
|---|---|---|---|---|
| 4,150,916 A | * | 4/1979 | Tsutsui | F04D 29/2277 415/143 |
| 4,275,988 A | * | 6/1981 | Kalashnikov | B01F 7/081 415/143 |
| 4,426,190 A | * | 1/1984 | Shapiro | F04D 29/2277 415/143 |
| 5,791,159 A | | 8/1998 | Aicher et al. | |
| 7,946,820 B2 | | 5/2011 | Cosi et al. | |
| 8,047,797 B2 | | 11/2011 | Cosi | |
| 9,360,002 B2 | * | 6/2016 | Sassanelli | F04D 29/5826 |
| 10,202,851 B2 | * | 2/2019 | Slotman | F04D 29/054 |
| 2008/0008602 A1 | * | 1/2008 | Pozivil | F17C 13/026 417/243 |
| 2014/0105765 A1 | | 4/2014 | Tonnessen | |
| 2015/0152884 A1 | * | 6/2015 | Guenard | F04D 17/122 417/243 |
| 2015/0322961 A1 | * | 11/2015 | Slotman | F01D 5/066 415/198.1 |
| 2017/0248154 A1 | * | 8/2017 | Nakaniwa | F04D 17/122 |

FOREIGN PATENT DOCUMENTS

| | | | | |
|---|---|---|---|---|
| CN | 103216998 A | | 7/2013 | |
| GB | 1300302 A | * | 12/1972 | F01D 11/06 |
| WO | 2013/048265 A1 | | 4/2013 | |

OTHER PUBLICATIONS

Guenard, D.G. et al., High pressure ration compressors with multiple intercooling and releated methods, GE co-pending Application No. CO2012A000030, filed on Jun. 6, 2013.

Tacconelli, R., et al., Compressor system for natural gas, method of Compressing natural gas and plant using them, GE co-pending Application No. CO2012A000002, filed on Jan. 27, 2012.

Italian Search Report and Written Opinion issued in connection with corresponding IT Application No. 102015000038033 dated Mar. 17, 2016.

International Search Report and Written Opinion issued in connection with corresponding PCT Application No. PCT/EP2016/067566 dated Sep. 22, 2016.

International Preliminary Report on Patentability issued in connection with corresponding PCT Application No. PCT/EP2016/067566 dated Jan. 30, 2018.

* cited by examiner

CHARGE GAS COMPRESSION TRAIN FOR ETHYLENE

TECHNICAL FIELD

Embodiments of the subject matter disclosed herein correspond to a charge gas compression train for ethylene.

BACKGROUND OF THE INVENTION

Ethylene is produced in the petrochemical industry by steam cracking. In this process, gaseous or light liquid hydrocarbons are heated to 750-950° C., inducing numerous free radical reactions followed by immediate quench to stop these reactions. This process converts large hydrocarbons into smaller ones and introduces unsaturation.

The production of ethylene comprises a primary compression of the cracked gas (3 stages or phases of compression) followed by a secondary compression (1 or 2 stages or phases). Hydrogen sulfide and carbon dioxide are removed usually during secondary compression.

For the primary and secondary compression turbo-compressor trains may be used, of the type comprising five machines mechanically coupled namely: a steam turbine, a gear box, a first group of low pressure compressors, and a second group of high pressure compressor. The gear box is a step-up type of gear, for example, increasing the rotation speed to 5000 RPM and transmitting this rotation to the first and second group of compressors.

The first group of low pressure compressors comprise a first compressor (having two groups of compression stages) of the double flow type receiving via two inputs the gas flow at an input pressure (e.g., of about 1.5-2 bar) and an input temperature (e.g., of about 35-50° C.), and outputting the gas flow at an output pressure (e.g., of about 2.5-4 bar) and an output temperature (e.g., of about 85-100° C.). The output gas is then cooled and input to a second compressor and third compressor. The second and third compressor are grouped in a two-section type compressor.

The second compressor receives an input gas flow at a first input pressure (e.g., 2.5-4 bar) and a first input temperature (e.g., of about 35-45° C.) and outputs a first output flow at a first output pressure (e.g., of about 5.5-7 bar) and a first output temperature (e.g., of about 85-95° C.). This first output flow is then cooled and input to the third compressor as a second flow at a second input pressure (e.g., 5-7 bar) and at a second input temperature (e.g., of about 35-45° C.). The third compressor then outputs a second output flow at a second output pressure (e.g., of about 10-12 bar) and at a second output temperature (e.g., of about 85-95° C.).

The compression of the gas taking place in the first, in the second and in the third compressor (or group of compressor stages) represents respectively the first, the second and the third stage (or phase) of the primary compression.

The output gas is then cooled again and input to the second group of high pressure compressors, comprising a fourth compressor and a fifth compressor. The fourth and fifth compressor are again grouped in a two-section type compressor.

The fourth compressor receives an input gas flow at a third input pressure (e.g., 10-11 bar) and at a third input temperature (e.g., of about 35-45° C.) and outputs a third output flow at a third output pressure (e.g., of about 15-25 bar) and a third output temperature (e.g., of about 85-95° C.). This third output flow is then cooled and input to the fifth compressor as a fourth flow at a fourth input pressure (e.g., 18.5-20 bar) and at a fourth input temperature (e.g., of about 35-50° C.). The fourth compressor finally outputs a fourth output flow at a fourth output pressure (e.g., of about 30-40 bar) and at a fourth output temperature (e.g., of about 85-95° C.).

The compression of the gas taking place in the fourth and in the fifth compressor (or group of compressor stages) represents respectively the first and second stage (or phase) of the secondary compression.

The footprint of the first group of low pressure compressor is relevant due to the presence of the first compressor of the double flow type, and of the second and third compressor of two-section type.

Moreover, the reliability of the entire system depends on the reliability of the gearbox, which is also a costly component.

SUMMARY OF INVENTION

Therefore, there is a general need for a charge gas compression train for ethylene, that is more reliable, less costly and less space consuming (in terms of footprint) if compared to the known trains.

An important idea is to directly couple a steam turbine to a group of low-pressure compressors.

Another important idea is to integrate the low-pressure compressors in a common casing.

First embodiments of the subject matter disclosed herein correspond to a charge gas compression train for ethylene.

Second embodiments of the subject matter disclosed herein correspond to charge gas compression train for ethylene of a smaller size.

BRIEF DESCRIPTION OF THE DRAWINGS

The accompanying drawings, which are incorporated herein and constitute a part of the specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
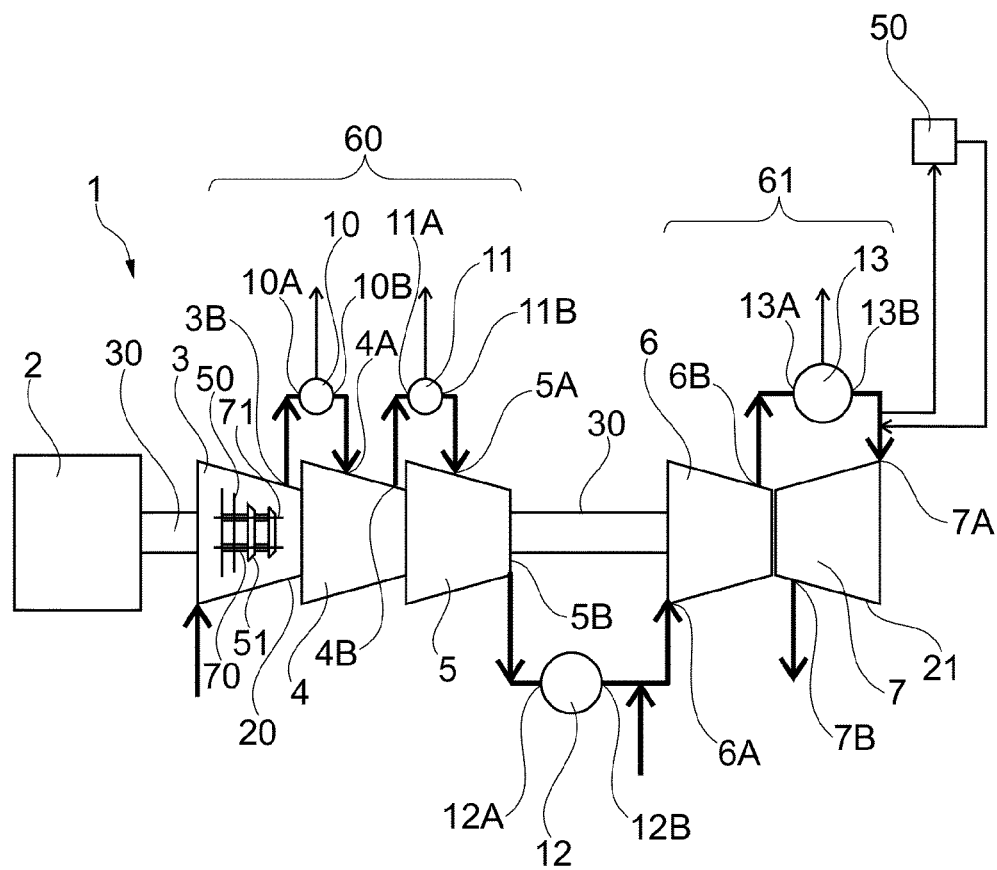
FIG. 1 schematically shows a charge gas compression train for ethylene.

FIG. 1 shows a charge gas compression train for ethylene. This train may be part of a plant producing between 0.8 to 1.4 Mton/Year.

The train comprises on the same shaft line a steam turbine 2, a first compressor 60 including a first group of compression stages 3, a second group of compression stages 4 and a third group of compression stages 5. The first 3, second 4 and third 5 group of compression stages form part of a so called low pressure compressor group.

The steam turbine 2 may be of the fast type, meaning that the shaft of the turbine may turn at a speed comprised between 5000 and 12000 RPM. It may comprise a first control stage of large diameter and a last stage equipped with high speed turbine blades.

The first 3, second 4 and third group of compression stages 5 may operate at the same rotation speed of the turbine. Therefore, the compressors may also be of the fast type, meaning that their shaft and impellers may turn at a speed between 5000 and 12000 RPM, and in some configurations, the rotating speed may reach 22000 RPM.

In order to achieve this compressor rotating speeds, at least one of the group of compression stages, in an embodiment, the first group of compression stages, may comprise a plurality of open (or unshrouded) impellers and shrouded impellers. In shrouded impellers, each blade tip is part of a common outer shroud, while in open or unshrouded impellers each blade has a free end tip. One or more impellers 50, 51 may be of the stackable type (and arranged in a stack), mechanically connected each other and blocked together to form a compressor rotor by means of at least an axial tie rod 71. In an embodiment, the upstream impeller/s of at least the first group of compressor impellers 3 is/are unshrouded 50 while the remaining impeller/s is/are shrouded 51. Moreover, the mechanical connection between at least two successive impellers may be of the Hirth type (Hirth coupling 70).

In an embodiment, the unshrouded impellers 50 may have larger diameter than the shrouded impellers 51. According to this configuration, the shrouds of the shrouded impellers are less sollicitated by the centrifugal forces.

Moreover, the compressor rotor may be arranged so to obtain a maximum rotating speed up to 22000 rpm.

The first group of compression stages 3 may comprise an outlet 3B configured to be connected to a first intercooler inlet 10A. The first intercooler 10 may be configured to collect compressed gas from the first compressor and deliver it to the second group of compression stages 4.

The second group of compression stages 4 may comprise a second compressor inlet 4A configured to be connected to a first intercooler outlet 10B. Moreover the second compressor 4 may comprise a second compressor outlet 4B configured to be connected to a second intercooler inlet 11A. The second intercooler 11 may collect compressed gas from the second group of compression stages and deliver it to the third group of compression stages 5.

The third group of compression stages 5 may comprise a third compressor inlet 5A configured to be connected to a second intercooler outlet 11B.

According to one aspect the first 3, the second 4 and the third group of compression stages 5 are integrated in a first common casing 20 and may rotate at the same rotating speed of the steam turbine 2. They may be mounted on the same compressor shaft 30. Moreover, the steam turbine 2 may be directly coupled with the compressor shaft 30, that may be formed in a single piece, or in different parts torsionally coupled.

That configuration strongly reduces the footprint of the train, reducing the space used by the first group of low pressure compressors.

Moreover, as the steam turbine 2 is directly coupled with the compressor shaft 30, a gearbox is no more needed and the overall reliability of the system is improved.

Turning back to the description of FIG. 1, it can be noticed that a second group of high-pressure compressors may be driven at the same speed of the steam turbine 2. It may be mounted on the same compressor shaft 30.

The second group of high-pressure compressors may comprise a second compressor 61, including a fourth group of compression stages 6 and a fifth group of compression stages 7.

The third group of compression stages 5 may comprise a third compressor outlet 5B configured to be coupled with a third intercooler inlet 12A. The third intercooler 12 may be configured to collect the gas leaving the third group of compression stages 5 and feed it to the fourth group of compression stages 6.

For this reason the fourth group of compression stages 6 may comprise a fourth compressor inlet 6A configured to be coupled with a third intercooler outlet 12B, and a fourth compressor outlet 6B configured to be coupled with a fourth intercooler inlet 13A. As the previous ones, the fourth intercooler 13 may collect the gas leaving the fourth group of compression stages 6 and feed it to the fifth group of compression stages 7.

A fourth intercooler outlet 13B may be connected, directly or through a caustic tower 50, to a fifth compressor inlet 7A, configured to be coupled with the fourth intercooler outlet 13B.

As it may be noticed, the fourth 6 and fifth group of compression stages 7 may be integrated in a second common casing 21 and may be mounted on the same compressor shaft 30. Therefore, the fourth and fifth group of compression stages may be a two-section type compressor.

In the above description, when reference is made to an inlet or outlet of one of the compressors, which is configured to be connected to an inlet or an outlet of an intercooler (i.e. an heat exchanger), it must be understood that the connection may be realized directly (for example through pipes) or through other suitable devices that may be used to convey the gas to and from the intercoolers and the compressors.

In the above-described example, the compressor shaft 30, during normal operation, may rotate at 5500 RPM (that is the same rotation speed of the steam turbine 2 and of the compressors).

In this condition, the first group of compression stages 3 may operate with a delivery pressure between 3 and 4 bar. The gas then enters the second group of compression stages 4.

The second group of compression stages 4 may include a delivery pressure between 6 and 8 bar. The gas may enter the third group of compression stages 5 at a pressure between 5 and 7 bar.

The third group of compression stages 5 may operate with a delivery pressure between 10 and 19 bar. The gas may enter the fourth group of compression stages 6 at a pressure of 10-12 bar.

The fourth group of compression stages 6 may operate with a delivery pressure between 18 and 22 bar.

The gas may enter the fifth group of compression stages 7 at a pressure of 17-21 bar.

The fifth group of compression stages 7 may operate with a delivery pressure between 35 and 40 bar.

In the description above some parameters like temperature and pressure are indicated as example. Of course, the ranges of the specific parameters may be slightly different form the ones mentioned, according to the train configuration and to the specific process parameters.

Figure 2:
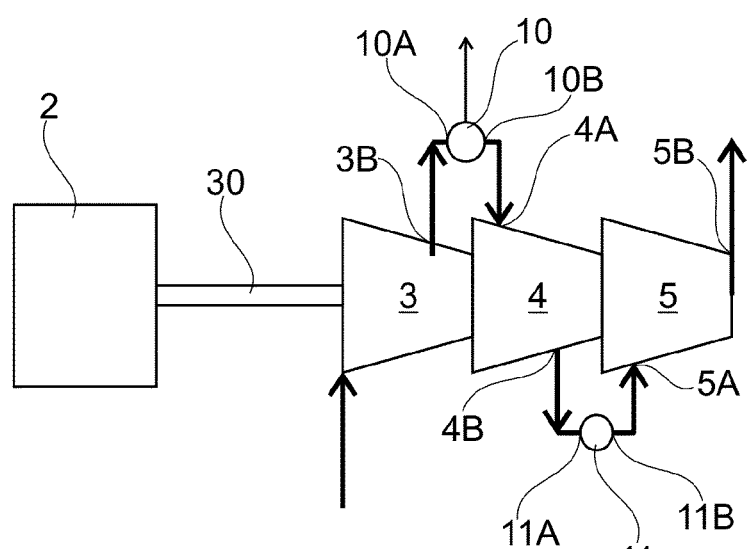
FIG. 2 schematically shows a charge gas compression train for ethylene of reduced size.

FIG. 2, shows an alternative embodiment of the ethylene gas charge compression train, specific for plants producing less than 0.8 Mton/Year.

The main difference is that, in this configuration, only the three group of compression stages are present. Therefore, there is no difference between a first group of low pressure compressor and a second group of high pressure compressors.

The single casing compressor, formed by three groups of compressor stages, is capable to produce gas at a pressure up to 21 bar.

In the description of this embodiment, those parts functionally similar to the ones already described will be indicated with the same reference numbers, and their description will be omitted.

In this configuration, the steam turbine 2 rotates at around 9000 RPM, corresponding to the rotating speed of the groups of compressor stages.

In this condition, the first group of compression stages 3 may operate with a delivery pressure between 3 and 4 bar. The gas may enter the second group of compression stages 4 at a pressure between 2 and 3.5 bar.

The second group of compression stages 4 may include a delivery pressure between 6 and 8 bar. The gas may enter the third group of compression stages 5 at a pressure between 6 and 7.5 bar.

The third group of compression stages 5 may operate with a delivery pressure between 10 and 19 bar.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A charge gas compression train for ethylene, comprising on the same shaft line a steam turbine and a first compressor comprising a first group of compression stages, a second group of compression stages and a third group of compression stages,
   the first group of compression stages comprising an outlet configured to be connected to a first intercooler inlet,
   the second group of compression stages comprising a second compressor inlet configured to be connected to a first intercooler outlet, the second group of compression stages comprising a second compressor outlet configured to be connected to a second intercooler inlet, and
   the third group of compression stages comprising a third compressor inlet configured to be connected to a second intercooler outlet,
   the first, the second and the third group of compression stages being integrated in a first common casing and operating at the same rotation speed of the steam turbine; and
   the first compressor comprising a plurality of unshrouded and shrouded impellers arranged within the first group of compression stages, wherein at least an unshrouded impeller is positioned upstream to at least a shrouded impeller and the unshrouded impeller has a larger diameter than the shrouded impeller.

2. The charge gas compression train according to claim 1 wherein the impellers of the first compressor are stacked each other and blocked together through at least a tie rod.

3. The charge gas compression train according to claim 1, wherein consecutive impellers are connected each other by means of a mechanical connection.

4. The charge gas compression train according to claim 1, wherein the mechanical connection is a Hirth coupling.

5. The charge gas compression train according to claim 1, wherein the first group of compression stages, the second group of compression stages and the third group of compression stages are mounted on the same compressor shaft, the steam turbine being directly coupled with the compressor shaft.

6. The charge gas compression train according to claim 1, further comprising a second compressor comprising a fourth and a fifth group of compression stages,
   the third group of compression stages comprising a third compressor outlet configured to be coupled with a third intercooler inlet,
   the fourth group of compression stages comprising a fourth compressor inlet configured to be coupled with a third intercooler outlet, and a fourth compressor outlet configured to be coupled with a fourth intercooler inlet, and
   the fifth group of compression stages comprising a fifth compressor inlet configured to be coupled with a fourth intercooler outlet,
   the fourth group of compression stages and the fifth group of compression stages being integrated in a second common casing and operating at the same rotation speed of the steam turbine.

7. The charge gas compression train according to claim 1, wherein the first group of compression stages operates with a delivery pressure between 3 and 4 bar, the second group of compression stages with a delivery pressure between 6 and 8 bar, and the third group of compression stages with a delivery pressure between 10 and 19 bar.

8. The charge gas compression train according to claim 1, wherein the fourth group of compression stages operates with a delivery pressure between 18 and 22 bar and the fifth group of compression stages operates with a delivery pressure between 35 and 40 bar.

9. The charge gas compression train according to claim 1, wherein the fourth and the fifth group of compression stages of the second compressor are mounted on the same compressor shaft of the first, second and third group of compression stages of the first compressor.

10. The charge gas compression train according to claim 1, wherein at least one between the steam turbine, the first compressor or the second compressor is configured to operate at a rotating speed up to 22000 rpm.

11. The charge gas compression train according to claim 1, wherein the compressor shaft is formed in a single piece, or in different parts torsionally coupled each other.

* * * * *